United States Patent [19]

Dobner

[11] Patent Number: 4,841,415

[45] Date of Patent: Jun. 20, 1989

[54] APPARATUS FOR LIGHTING A SEWING AREA OF A SEWING MACHINE

[75] Inventor: Reinhold Dobner, Kaiserslautern, Fed. Rep. of Germany

[73] Assignee: G. M. Pfaff, AG, Fed. Rep. of Germany

[21] Appl. No.: 163,769

[22] Filed: Mar. 3, 1988

[30] Foreign Application Priority Data

Mar. 11, 1987 [DE] Fed. Rep. of Germany ....... 8703621

[51] Int. Cl.$^4$ .............................................. D05B 79/00
[52] U.S. Cl. ........................................ 362/90; 362/32; 350/96.10
[58] Field of Search ................. 362/32, 90; 350/96.10, 350/96.24, 96.25, 96.26

[56] References Cited

U.S. PATENT DOCUMENTS 1,783,519 12/1930 Parker .................................... 362/90
4,322,781 3/1982 Peterson ................................ 362/32
4,677,531 6/1987 Szeles ..................................... 362/32

FOREIGN PATENT DOCUMENTS 1092285 11/1960 Fed. Rep. of Germany ........ 362/90
2315220 3/1973 Fed. Rep. of Germany ........ 362/32

Primary Examiner—Michael Koczo
Assistant Examiner—Peggy A. Neils
Attorney, Agent, or Firm—McGlew & Tuttle

[57] ABSTRACT

A lighting device for a sewing machine which has a housing with a base and an upright portion mounted on the base and an arm carried by the upright portion which overlies the base in which there is positioned a movable thread needle which operates below the arm to sew materials and which comprises a light source carried in the housing and a flexible sheath supported in the arm of the housing and extends outwardly of the arm in the vicinity of the needle. The sheath carries at least two light guides which have first ends exposed to the light source mounted on the sewing machine housing and an opposite second ends which extend out of the sheath in the vicinity of the needle. The sheath and the light guides are bendable so as to arrange the second ends of the light guide in a selected manner for illuminating selective areas in the vicinity of the needle.

10 Claims, 1 Drawing Sheet

U.S. Patent
Jun. 20, 1989
4,841,415
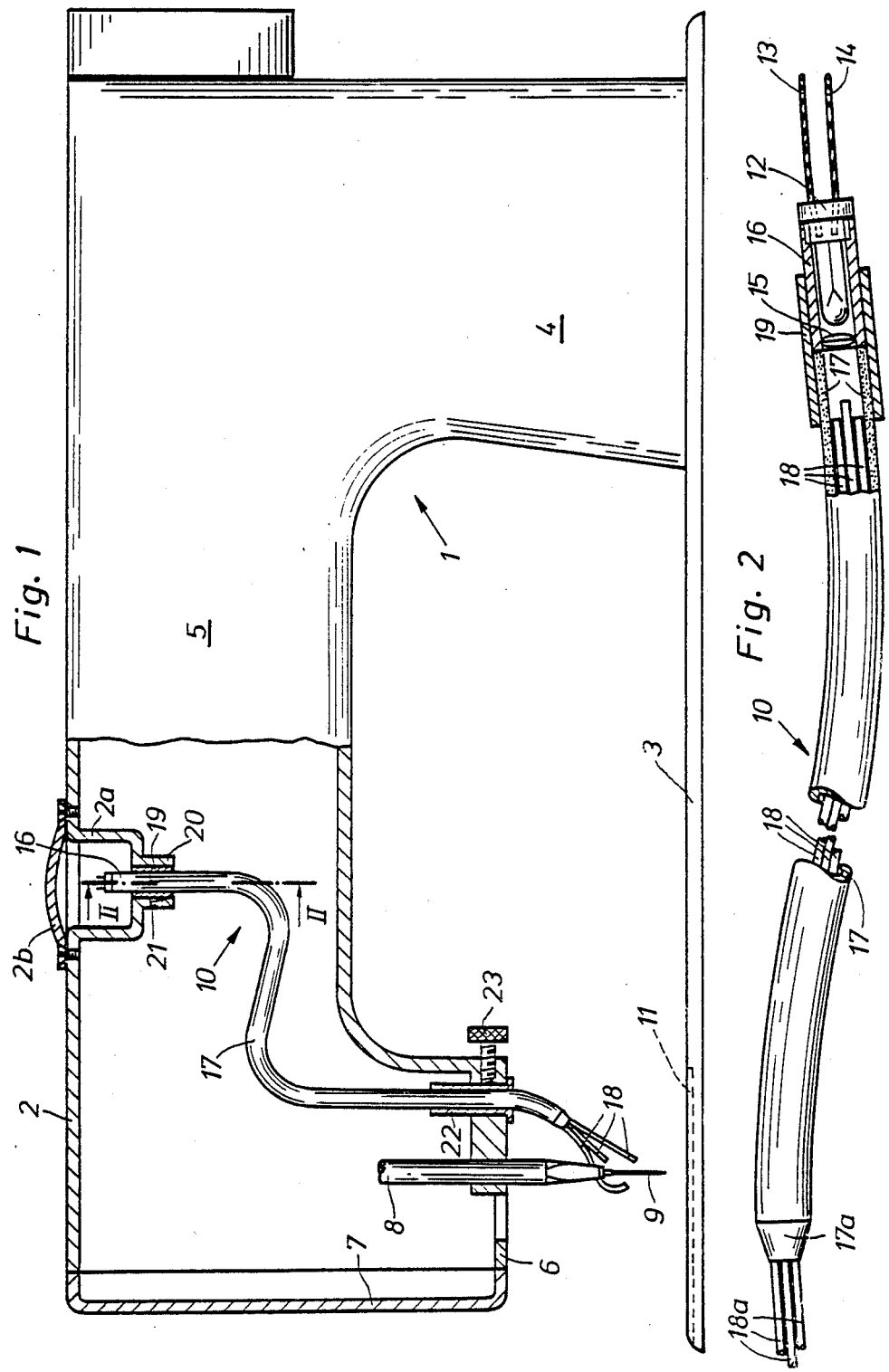

APPARATUS FOR LIGHTING A SEWING AREA OF A SEWING MACHINE

BACKGROUND OF THE INVENTION

Field of the Invention

This invention relates in general to sewing machines and in particular to a new and useful method and apparatus for illuminating an area in the vicinity of a sewing needle.

A similar lighting system is known from German Pat. No. 28 14 962. The light beams emitted from a light source are conveyed to a light distributor, which is connected to several plastic deformable arms. Each arm has a lightguide and a hose enveloping the guide. The free ends of the arms are each joined to a light head, which diffuses the transmitted light beams.

However, the diffusion action of the light heads may produce an uneven illumination, which may result in formation of unwanted shadow zones, especially in the case of illuminated objects of unfavorable geometrical shape, in the places not directly illuminated, such as those behind projections.

SUMMARY OF THE INVENTION

The invention provides a light such that surfaces of any given geometrical configuration can be evenly illuminated by a single light source.

In accordance with the invention the lighting system includes a flexible member containing a plurality of light guiding elements which have their one ends exposed to a light source and opposite ends which are selectively arrangeable to illuminative selected areas.

Surfaces spatialy removed from the light source can be illuminated from various directions, due to the flexibly formed lightguides, which protrude from their common sheath at the free end. For this, the free end of each individual lightguide should be positioned in such a way, by plastic bending, that the emitted light impinges on a predetermined portion of the surface to be illuminated. The lighting will be more uniform as there are more lightguides in the common sheath, for in this case each portion of objects even with geometrically unfavorable surface can be directly illuminated by at least one lightguide. The uniformity of the illumination is optimal when the individual lightguides are disposed with respect to each other so that the omitted cones of light overlap at least in part.

The mounting of the sheath for the light guide so that it is movable in the housing better adapts the point of illumination to the particular position of fabric being sewn or to the course of a stitch being made. Thus, for example, moving the sheath in the vertical direction makes it possible to change the size of the illuminated surface, while the position of the individual emitted cones of light can be changed by moving the sheath in the horizontal direction relative to the surface. With a subsequent fine adjustment, the surface can then be illuminated at any predetermined angle.

The sheath is mounted in a tubular bearing to permit adjustment of the sheath in the vertical direction.

Accordingly it is an object of the invention to provide a light assembly which comprises a light source which emits light beams which fall on one of the ends of a plurality of light guides which are contained in a deformable sheath, which has an opposite end out of which the light guides project and, which may be arranged in selective locations for illuminating an area in a controlled manner.

A further object of the invention is to provide a sewing machine which includes the housing of a sewing machine which has an arm portion carrying a flexible member having light guides therein, which have their one ends exposed to a light source carried on the sewing machine housing in opposite ends which project out of the arm of the sewing machine toward a reciprocating needle with the light guides being individually positionable so as to alight selective areas around the needle and the base of the sewing machine.

A further object of the invention is to provide a light system which is simple in design, rugged in construction and economical to manufacture.

The various features of novelty which characterize the invention are pointed out with particularity in the claims annexed to and forming a part of this disclosure. For a better understanding of the invention, its operating advantages and specific objects obtained by its uses, reference is made to the accompanying drawings and descriptive matter in which a preferred embodiments of the invention is illustrated.

BRIEF DESCRIPTION OF THE DRAWINGS

In the drawings:

FIG. 1 is a side elevational view partly in section of a sewing machine with a light device constructed in accordance with the invention; and FIG. 2 is a pictorial representation of the light direction including a section taken along line II—II of FIG. 1.

DESCRIPTION OF THE PREFERRED EMBODIMENTS

Referring to the drawings in particular the invention embodied therein comprises a lighting device, or a lighting system particularly for a sewing machine which has a housing 2 with a base 3, an upright portion 4 mounted on the base and an arm 5 carried by the upright portion 4 and overlying the base. The lighting device includes the light source which for example, is contained in the arm portion of the sewing machine and may be visible, for example, through a transparent cover at the top of the arm and which illuminates the ends of a plurality of light guides which are contained within a flexible sheath, which is mounted in a bearing in the housing in a manner such that it may be adjusted in the end of the sheath which is adjacent the light source. The opposite end of the sheath is positioned to extend through a sleeve or bearing 22 which may be adjusted in the bottom of the arm portion 5 of the sewing machine. The lower end of the flexible sheaths 17 is adjustable within the bearing 22 and the bearing itself may be adjusted and held in position by a set screw 23. Individual light guides 18 extend out of the sheath 17 at the lower end and they may be selectably arranged around a needle 9 for illuminating a sewing area 11 on the base 3.

FIG. 1 shows the sewing machine 1 having the housing 2 which includes the base plate 3, an upright portion 4, an arm 5 and a head 6. A needle bar 8 is mounted for reciprocation in the head 6, which is closed by a cover 7. A needle 9 is contained in the needle bar 8.

A light, or light assembly generally designated 10 is provided for illumination of a needle plate 11 or the needle 9, provided on the housing 2.

The light 10 has an incandescent bulb 12 as the light source (FIG. 2), which is connected via lines 13 and 14 to a conventional voltage source, not shown. The bulb 12, with a lens 15 mounted in front of it, is placed in a socket 16.

The socket 16 borders on one end of a sheath 17, which envelops a number of lightguides 18. This end of the sheath 17, like the socket 16, is secured in the bushing or sleeve 19, which is accommodated in a bearing 20 of the housing 2 and can be adjusted in the bearing 20 by a set screw 21. For this purpose the housing 2 has a small indentation 2a which is closed by a cover 2b which has a transparent portion.

The free end 17a of the sheath 17 is contained in a vertically movable socket or bearing 22, mounted in the head 6 of the sewing machine 1. The socket 22 can be positioned by an adjustment screw 23 in the head 6.

The lightguides 18, like the sheath 17, are bendable or flexible and protrude a distance beyond the free end 17a of the sheath. Each lightguide 18 has at least a free end 18a which is plastically deformable with respect to the sheath 17 and/or the other lightguides so that they may be arranged in any selected pattern.

The arrangement operates as follows:

The light emitted by the bulb 12 is collected by the lens 15 and distributed to the individual lightguide 18. Each lightguide 18 transmits the portion of light allotted to it to the needle plate 11. The lightguides 18 at their free ends 18a are to be positioned in such a way, as demanded by the task, that the needle plate 11 is either illuminated as evenly as possible, or a selected portion of the needle plate 11 and/or the needle receives especially intense illumination.

While the end of the sheath 17 held by the bushing 19 is firmly arranged in the housing 2, the free end 17a can be moved in the vertical direction by loosening the adjusting screw 23. This changes the distance between the lightguide 18 and the needle plate 11, so that the size of the illuminated surface and the intensity of light impinging thereon can be adjusted.

To adjust the angle of illumination, the sheath 17 can be bent up or down, due to its flexible configuration below the socket 22.

While specific embodiments of the invention have been shown and described in detail to illustrate the application of the principals of the invention, it will be understood that the invention may be embodied otherwise without departing from such principles.

What is claimed is:

1. A lighting device for a sewing machine having a housing with a base, an upright portion mounted on the base and an arm portion carried by the upright portion overlying the base and with a needle carried by the arm portion for movement to effect sewing over the base portion, comprising a light source carried on said housing, a flexible sheath supported in the arm portion and extending outwardly of the arm portion in a vicinity of the needle, at least two light guides in said sheath having first ends exposed to said light source and opposite second ends extending out of said sheath in the vicinity of the needle, said sheath being bendable and each of said light guides being bendable independently so as to arrange said second ends, extending out of said sheath, to illuminate effective areas in the vicinity of said needle.

2. A lighting assembly according to claim 1 wherein said portion of said free ends of said light guides extending out of said sheath are positionable in selected locations with respect to said sewing machine housing.

3. A lighting assembly according to claim 2, including means mounting said sheath in said housing for movement into and out of said housing.

4. A lighting assembly according to claim 1 further comprising an adjustable bearing connected to the sewing machine housing, said sheath extending through said bearing and having a free end extending out of said housing with said light guide free ends; and, means for adjusting the position of said bearing in said housing.

5. A lighting device according to claim 1, wherein said housing arm portion has an indented area containing said light source and including a cover over said indented area having a transparent portion.

6. A lighting device according to claim 5, wherein said indentation has a bearing opening through which said sheath extends, a sleeve carrying said sheath in said bearing opening permitting upward and downward movement of said sheath.

7. A lighting device according to claim 6, including a second bearing contained in said arm portion adjacent the bottom thereof, through which the needle extends, and an additional sleeve containing said sheath being mounted for adjustable movement in said lower portion of said housing arm portion.

8. A method of illuminating areas particularly of a sewing machine having a sewing machine housing and a needle, comprising arranging a light source on the housing, and positioning a plurality of light guides so that their first ends are exposed to said light source and their opposite second ends extend out of said housing in the vicinity of said needle; enclosing the plurality of light guides within a sheath except for said first and second ends and independently positioning said second ends in selected locations with respect to said housing.

9. A method according to claim 8, wherein the light guides are used for illuminating the area of a reciprocating needle of a sewing machine and in which the light guides are contained in the housing so as to be movable inwardly and outwardly of the housing and wherein the light guides have ends which are bent into position to distribute the light from the light source to selected locations.

10. A method according to claim 8, wherein said light guides are contained in an elastic sheath which is mounted in said housing for movement inwardly and outwardly of said housing, said second ends of said light guides extending out of said sheath and being positionable at selective locations in respect to said sheath.

* * * * *